United States Patent [19]
Brown et al.

[11] Patent Number: 6,073,592
[45] Date of Patent: Jun. 13, 2000

[54] APPARATUS FOR AN ENGINE CONTROL SYSTEM

[75] Inventors: Scott C. Brown, Peoria; Raymond G. Evans, Lafayette; James B. Maddock, Washington; Shawn J. Weck, Edwards, all of Ill.

[73] Assignee: Caterpillar Inc., Peoria, Ill.

[21] Appl. No.: 09/036,366

[22] Filed: Mar. 6, 1998

[51] Int. Cl.[7] ...................................... F02B 3/00
[52] U.S. Cl. ...................................... 123/27 GE
[58] Field of Search ........................ 123/27 GE, 352, 123/525, 575, 1 A

[56] References Cited

U.S. PATENT DOCUMENTS

| | | | |
|---|---|---|---|
| 4,597,364 | 7/1986 | Young | 123/27 GE |
| 4,641,615 | 2/1987 | Smith | 123/575 |
| 4,641,625 | 2/1987 | Smith | 123/27 GE |
| 4,730,256 | 3/1988 | Niimi et al. | 364/132 |
| 4,955,326 | 9/1990 | Helmich | 123/27 GE |
| 5,136,986 | 8/1992 | Jensen | 123/27 GE |
| 5,140,959 | 8/1992 | Durbin | 123/304 |
| 5,150,685 | 9/1992 | Porter et al. | 123/478 |
| 5,224,457 | 7/1993 | Arsenault et al. | 123/526 |
| 5,226,396 | 7/1993 | Bailey | 123/494 |
| 5,379,740 | 1/1995 | Moore et al. | 123/27 GE |
| 5,398,724 | 3/1995 | Vars et al. | 137/625.33 |
| 5,413,075 | 5/1995 | Mamiya et al. | 123/431 |
| 5,450,829 | 9/1995 | Beck | 123/435 |
| 5,477,830 | 12/1995 | Beck et al. | 123/470 |
| 5,526,786 | 6/1996 | Beck et al. | 123/357 |
| 5,528,901 | 6/1996 | Willis | 123/DIG. 8 |
| 5,737,630 | 4/1998 | Kobayashi | 364/132 |
| 5,771,860 | 6/1998 | Bernardi | 123/352 |

*Primary Examiner*—Willis R. Wolfe
*Assistant Examiner*—Jason Benton
*Attorney, Agent, or Firm*—Mary Jo Bertani; Carl Wilbur

[57] ABSTRACT

In one embodiment of the present invention an apparatus for controlling one or more engines by synchronizing the functions of two or more electronic control modules includes a master electronic control module, one or more slave electronic control modules, and one or more data links for transferring data between the electronic control modules. Engine control and monitoring functions are divided between the master electronic control module and the slave electronic control modules. The present invention may be used to control and monitor dual fuel engines and engines that operate on one type of fuel. The master electronic control module may transition operation of the engine to the diesel fuel only mode in the event of a failure of any dual fuel mode specific components. The master ECM coordinates timing and speed of fuel injection to engine cylinders using input from an adjustable engine speed command device and a speed sensor connected to each engine. The loads driven by the engines may be allocated evenly or unevenly.

5 Claims, 5 Drawing Sheets

APPARATUS FOR AN ENGINE CONTROL SYSTEM

TECHNICAL FIELD

The present invention relates generally to engine control systems, and more particularly, to controlling one or more engines by distributing control functions among a plurality of electronic control modules.

BACKGROUND ART

In the art of controlling internal combustion engines, it may be desired to use an existing electronic control module (ECM) to control operation of a new or existing engine to reduce production costs and product development time. Problems arise, however, if the electronic control module cannot accommodate system requirements. One such situation arises in the development of dual fuel engines that operate in either a dual fuel mode or a diesel fuel mode. For the dual fuel mode, a gaseous fuel such as natural gas is controllably released into an air intake port connected to a cylinder, producing an air/fuel mixture. After a predetermined period of time, a small amount of diesel fuel is injected into the cylinder containing the air/fuel mixture. The compression ignites the diesel fuel, which in turn ignites the air/fuel mixture. The dual fuel engine has a solenoid gaseous fuel admission valve (SOGAV) for metering the natural gas along with an electronic unit injector (EUI) for injecting diesel fuel for each cylinder. Thus, control systems for dual fuel engines must control twice the number of device drivers per cylinder, one for the SOGAV and one for the EUI. Further, the SOGAVs require a relatively long duration of time to admit the required amount of gaseous fuel, and multiple SOGAVs may therefore be open simultaneously. Electronic engine control modules designed for engines that operate with one type of fuel typically control only one injector per cylinder and therefore may not be equipped to accommodate all of the SOGAVs and EUIs of the dual fuel engine.

Another situation where one electronic control module may not meet requirements of an application arises where it is desired to use a particular engine model, but the engine does not deliver the required amount of power. The engine may be a dual fuel engine, or conventional engine that operates continuously on one type of fuel. The most economical solution may be to use two engines, instead of switching to a larger engine or re-engineering the existing engine to deliver more power. In these situations, it is necessary to synchronize control of the engines so that they operate together efficiently. A problem arises if the existing electronic control module is not designed to accommodate the number fuel injectors present between the two engines. For example, two engines may include a total of 16 cylinders, each cylinder having an EUI, but the existing electronic control module may be designed to accommodate only 12 cylinders. Thus, the existing electronic control module does not have means to inject fuel in 4 cylinders.

Accordingly, the present invention is directed to overcoming one or more of the problems as set forth above.

DISCLOSURE OF THE INVENTION

In one embodiment of the present invention an apparatus for synchronizing the functions of two or more electronic control modules includes a master electronic control module and one or more slave electronic control modules associated with one or more dual fuel engines. The master electronic control module drives the diesel fuel injectors, processes sensor data required for diesel operation, monitors and protects the engine during diesel operation, starts and stops the engine, and processes operator input. The remaining engine control functions are allocated among the slave electronic control modules, which includes controlling the gaseous fuel admission valves. The master ECM transitions operation to the diesel fuel only mode in the event of a failure of any dual fuel mode specific components.

An alternate embodiment of the present invention also includes a master electronic control module and two or more slave electronic control modules associated with two or more engines. When using conventional internal combustion engines operating on one type of fuel, the master electronic control module transmits a fuel flow command to each slave electronic control module. The fuel flow command is computed using the throttle setting and data from one or more engine speed sensors. A different fuel flow command may be computed for each engine. A speed sensor is connected to each engine, and each slave electronic control module transmits engine speed and maximum fuel flow rate to the master electronic control module. The master electronic control module may receive data directly from the engine speed sensors or indirectly from the slave electronic control modules. The loads driven by the engines may be allocated evenly or unevenly, depending on the performance characteristics of the engines and the performance objectives to be achieved.

BEST MODE FOR CARRYING OUT THE INVENTION

Figure 1:
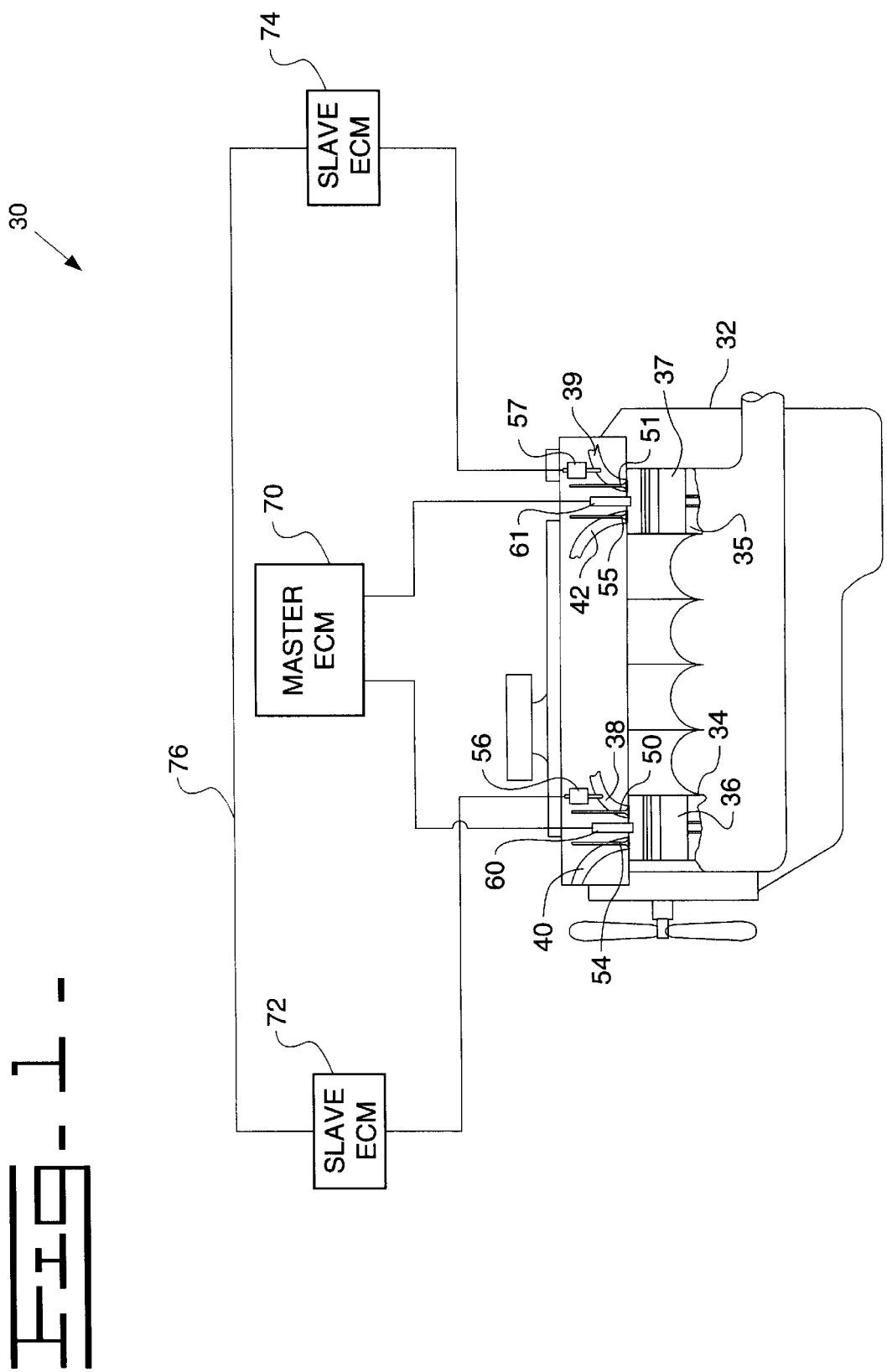
FIG. 1 shows a diagrammatic view of a dual fuel engine and connections between the engine, a master electronic control module, and two slave electronic control modules.

Referring to the drawings, a preferred embodiment of an apparatus 30 for controlling a dual fuel engine 32 according to the present invention is depicted in FIG. 1 with representative cylinders 34, 35 shown. Although only two cylinders 34, 35 are shown, it is recognized that additional cylinders may be included in the engine 32 and that engine 32 could be of the in-line type, v-type, or even a rotary type engine. A piston 36, 37 is positioned for movement within each cylinder 34, 35 which cylinder 34, 35 includes an intake port 38, 39, an exhaust port 40, 42, an intake valve 50, 51, and an exhaust valve 54, 55. Intake ports 38, 39 receive air from an air intake manifold (not shown) to which intake air travels after passing through, for example, an air filter (not shown) and turbocharger (not shown). Gaseous fuel admission valves 56, 57 are positioned between a gaseous fuel manifold (not shown) at an upstream side and intake port 38, 39 at a downstream side to inject gaseous fuel into respective intake ports 38, 39. Gaseous fuel admission valves 56, 57 may, for example, be of the type shown and described in U.S. Pat. No. 5,398,724 available from Woodward Governor Company. Engine 32 includes fuel injectors 60, 61, such as electronic unit injectors, positioned for injecting liquid fuel, such as diesel fuel, into cylinders 34, 35. The liquid fuel may be provided to fuel injectors 60, 61 by means commonly known in the art. Although not shown, it is recognized that such a system might typically include a balance regulator positioned between gaseous fuel source (not shown) and gaseous fuel manifold (not shown) for regulating the gaseous fuel pressure at the upstream side of gaseous fuel admission valves 56, 57.

A plurality of electronic control modules (ECMs) 70, 72, 74 are connected in a master/slave configuration as shown in FIG. 1. One or more data links 76 provide means for transferring data between a master ECM 70 and slave ECMs 72, 74. The slave ECMs 72, 74 are connected to transmit signals to operate components in the engine 32, such as the gaseous fuel admission valves 56, 57, and to receive information from engine sensors as discussed hereinbelow. In a preferred embodiment of the present invention, the master ECM 70 controls the diesel fuel mode functions of the engine 32, and the slave ECMs 72, 74 control the gaseous fuel functions when the engine 32 is operating in the dual fuel mode. Thus, the master ECM 70 is connected to drive the liquid fuel injectors or electronic unit injectors (EUIs) 60, 61 in the engine 32, while the slave ECMs 72, 74 drive the gaseous fuel admission valves 56, 57. With the functions separated in this manner, the master ECM 70 can transition operation of the engine to the diesel fuel only mode if it detects failure of one or both of the slave ECMs 72, 74, or if communication between the ECMs 70, 72, 74 fails. Advantageously, the engine 32 can continue to operate even if one or both of the slave ECMs 72, 74 fail.

Figure 2:
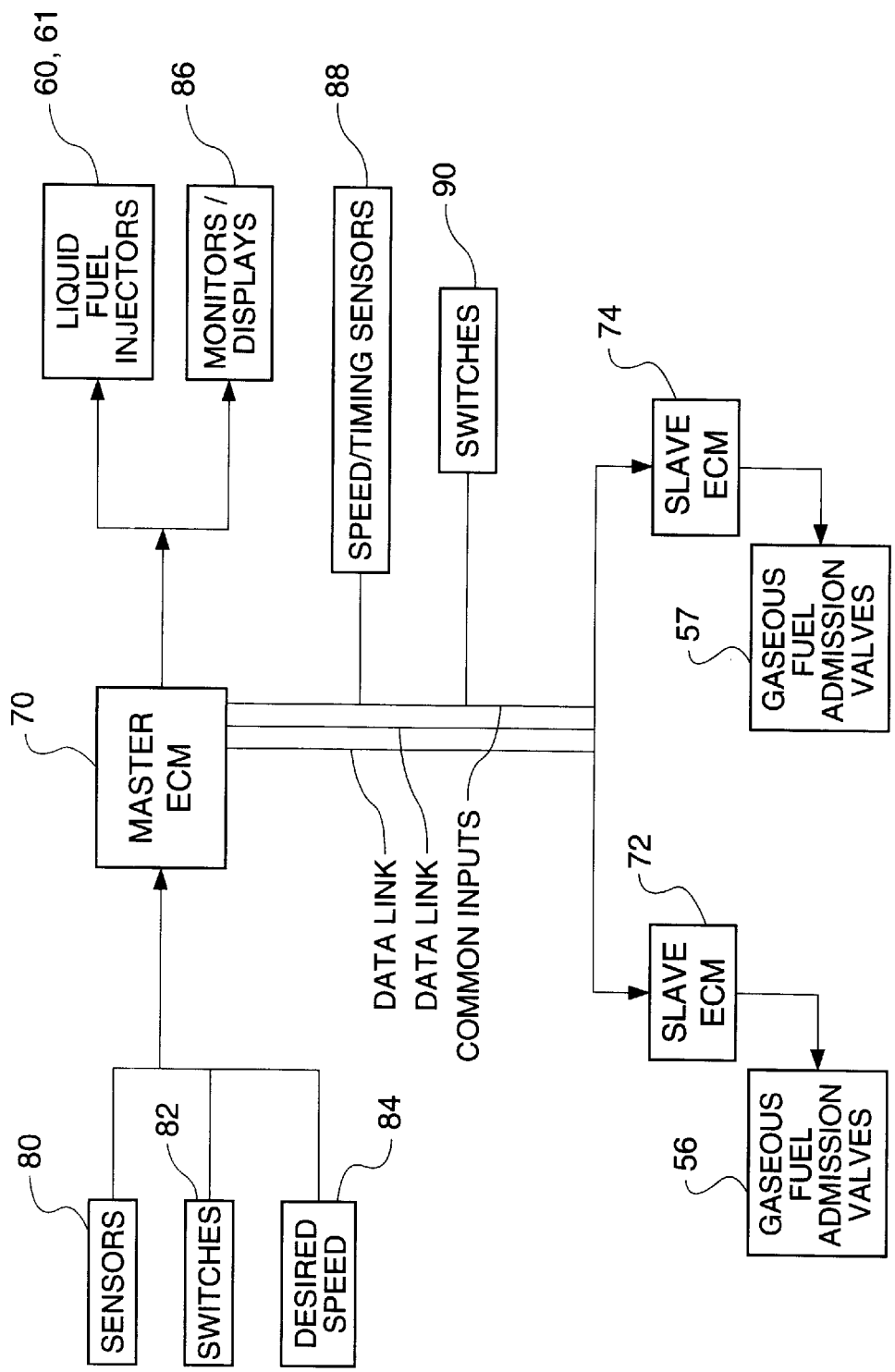
FIG. 2 shows a block diagram of the connections between a master electronic control module, and two slave electronic control modules for a dual fuel engine application.

FIG. 2 shows a more detailed block diagram of the connections between the master ECM 70, the slave ECMs 72, 74, and various engine components and sensors. The functions performed by the master ECM 70 include driving the liquid fuel injectors 60, 61, processing sensor data, monitoring and protecting the engine during operation, starting and stopping the engine, and processing operator input. The master ECM 70 receives several different types of input signals including signals from sensors 80, switches 82, and desired speed 84. The sensors 80 may provide information including manifold temperature, fuel temperature, water temperature, oil temperature, oil pressure, and crank case pressure that aids the master ECM 70 in monitoring the engine and evaluating its operation. The dual fuel engine 32 may also be equipped with vibration sensors that provide information regarding movement of engine components, such as detonation in each of the cylinders 34, 35, or opening and closing of the gaseous fuel admission valves 56, 57. Other sensors 80 may provide information on parameters such as manifold pressure, fuel pressure, liquid fuel temperature, liquid fuel pressure, wastegate feedback, metal particle detection, and hydraulics pressure. The switches 82 may include dual fuel mode selection, and operator stop switches, along with any other switches that are accessible by an operator to control the engine. The desired speed 84 may be input through an adjustable engine speed command device such as a rotatable knob that outputs an electrical signal proportional to the desired speed. The desired speed 84 may also be a predetermined speed stored in memory associated with data processing means such as a microprocessor with memory. The master ECM 70 also shares common inputs with the slave ECMs 72, 74 from engine speed/timing sensors 88 and switches 90 that include emergency stop and ignition key switch.

The master ECM 70 transmits several different types of signals including signals to operate the liquid fuel injectors 60, 61, as well as to provide information to monitor and display devices 86. The monitors and displays 86 may include one or more gages, flashing, steady, and/or colored lights, graphics displays, bells, sirens, or any other type of audio or visual device that is capable of providing an appropriate indication of the engine's operation. The mode of engine operation is typically determined based upon both an operator input, such as by a mode switch, as well as monitored engine parameters. If the engine is operating in the liquid fuel mode, the master ECM 70 establishes a value which is indicative of the liquid fuel flow rate necessary to maintain a desired engine speed based upon a comparison of the sensed engine speed and the desired engine speed. The duration of a liquid fuel control signal corresponding to the value indicative of the liquid fuel flow rate is determined and liquid fuel is then delivered to engine 32 by delivering the liquid fuel control signal of the determined duration to liquid fuel injectors 60, 61.

Figure 3:
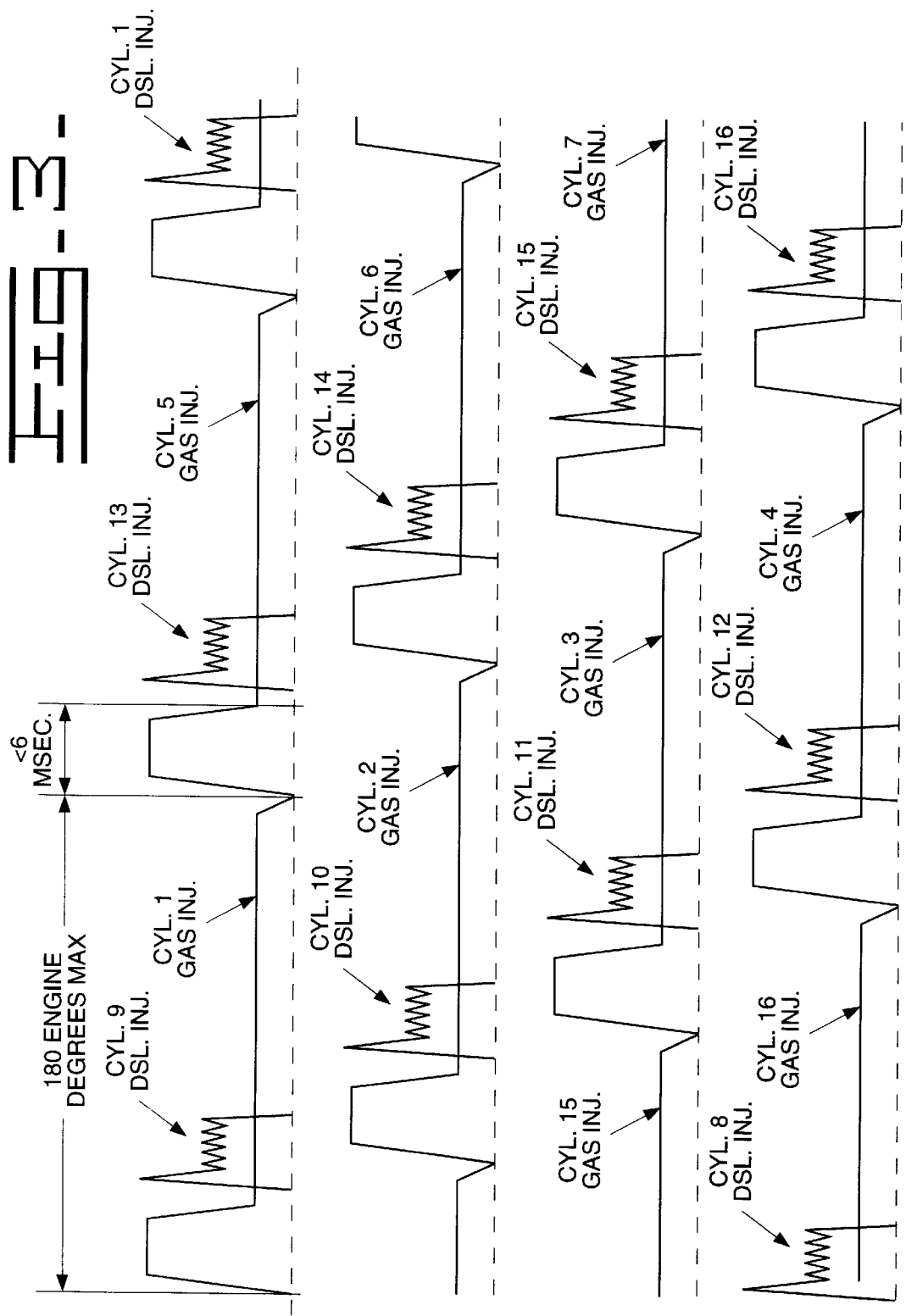
FIG. 3 is a diagram of a fuel injection sequence in a 16 cylinder dual fuel engine.

If the engine is operating in the dual fuel mode, the master ECM 70 establishes a value (X) in the same manner as explained above, which value (X) is indicative of the total fuel energy rate command to maintain the desired engine speed. A first value (Y) indicative of the liquid fuel energy rate command to be delivered to the engine and a value (Z) indicative of the gaseous fuel energy rate command are then determined in accordance with the equation Z=X−Y. The master ECM 70 transmits the gaseous fuel energy rate command (Z), the injection sequence, and the fuel injection timing for each cylinder to the slave ECMs 72, 74 via data link 76. The slave ECMs 72, 74 determine the duration of gaseous fuel admission valve 56, 57 control signals necessary to deliver an amount of gaseous fuel which provides the commanded gaseous fuel energy rate. The master ECM 70 determines the duration of liquid fuel injector 60, 61 control signals necessary to deliver an amount of liquid fuel to provide the commanded liquid fuel energy rate. Alternatively, the master ECM 70 may also compute the duration of the gaseous fuel control signals instead of the slave ECMs 72, 74. The gaseous fuel and liquid fuel are then delivered at the appropriate time to the respective cylinders 34, 35 for the determined durations. FIG. 3 shows a partial injection sequence for both liquid fuel (abbreviated DSL INJ) and gaseous fuel injections (abbreviated GAS INJ) for a 16 cylinder engine. The fuel injection sequence and timing may vary between engines and FIG. 3 is illustrative of one possible injection sequence.

In order to maintain inventory of the amount of gaseous fuel available in the supply, the slave ECMs 72, 74 transmit the duration of the gaseous fuel admission valve control signal to the master ECM 70. The master ECM 70 may then send signals to gaseous and liquid fuel level displays 86 to provide an indication to the operator of the amounts of liquid and gaseous fuel remaining.

In FIG. 2, the slave ECMs 72, 74 are connected to the engine 32 to transmit control signals to the gaseous fuel admission valves 50, 51. Each slave ECM drives a subset of the total number of gaseous fuel admission valves 50, 51 in the engine 32. For example, one slave ECM may control gaseous fuel injection in even-numbered cylinders (2, 4, 6, 8, 10, 12, 14, 16), while gaseous fuel injection in odd-numbered cylinders (1, 3, 5, 7, 9, 11, 13, 15) is controlled by the other slave ECM. If only one slave ECM is required, then the gaseous fuel admission valves may be controlled by the slave ECM or control may be divided between the master ECM and the slave ECM.

Figure 4:
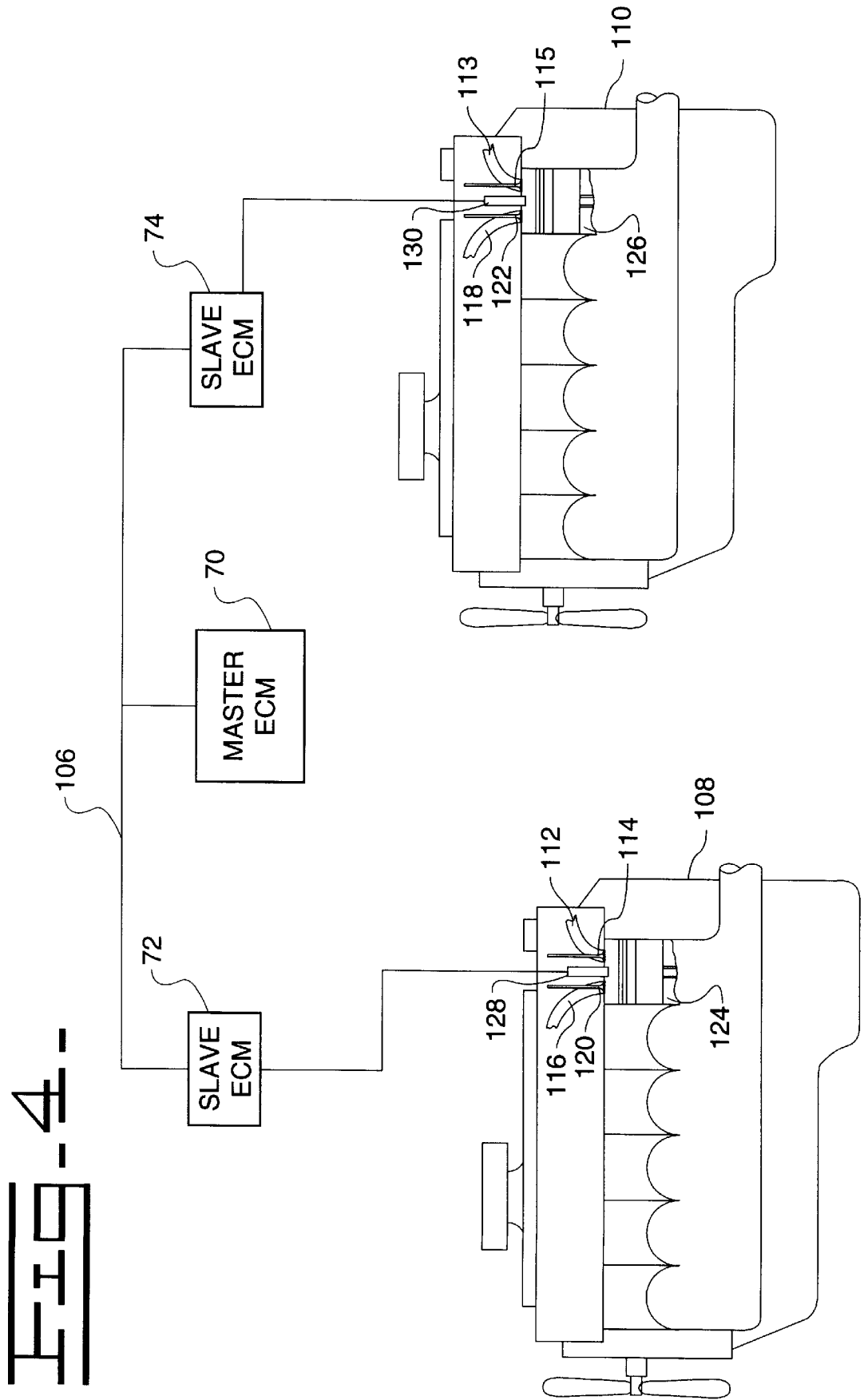
FIG. 4 shows a diagrammatic view of connections between tandem engines, a master electronic control module, and two slave electronic control modules.

The present invention may also be used in a situation where an engine does not meet the power requirements of a particular application and the preferred solution may be to use two or more engines in a tandem arrangement. FIG. 4 shows an embodiment of the present invention including a master ECM 70 connected to two slave ECMs 72, 74 through one or more data links 106. Each slave ECM 72, 74 is connected to an engine 108, 110. FIG. 4 shows engines 108, 110 that burn only one type of fuel throughout the entire operating cycle, however, it is recognized that dual fuel engines may also be configured in a tandem arrangement and controlled by a master ECM linked to one or more slave ECMs per engine.

The engines 108, 110 include air intake ports 112, 113, air intake valves 114, 115, exhaust ports 116, 118, and exhaust valves 120, 122 connected to cylinders 124, 126. The engines 108, 110 operate using liquid fuel in which diesel or some other liquid fuel is delivered in the engine cylinders by liquid fuel injectors 128, 130. The intake-compression-combustion-exhaust cycle of internal combustion engines that operate using a single fuel is well known in the art and therefore is not described in detail herein. It is important to note, however, that single fuel engines typically include one liquid fuel injector per cylinder, and therefore one slave ECM 72, 74 per engine 108, 110, with the slave ECMs 72, 74 being connected to one master ECM 70, may be sufficient to synchronize and operate the engines 108, 110. With two or more dual fuel engines, more than one ECM per engine may be required to control the engines because each cylinder includes both a liquid fuel injector and a gaseous fuel admission valve.

Figure 5:
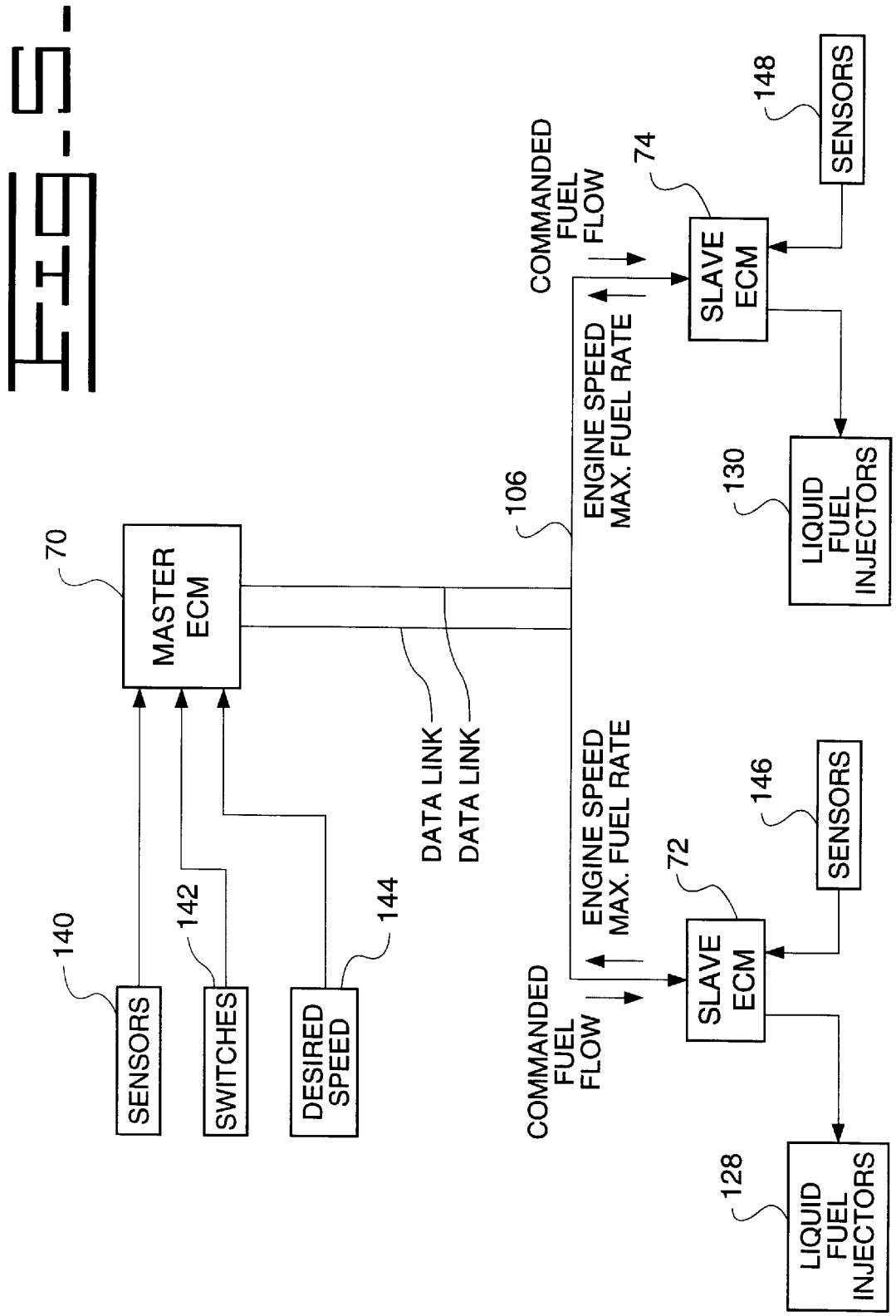
FIG. 5 shows a block diagram of the connections between a master electronic control module, and two slave electronic control modules for a tandem engine application.

FIG. 5 shows a block diagram of connections between the master ECM 70, the slave ECMs 72, 74, and various engine components of two single fuel engines arranged according to the present invention. The master ECM 70 receives input from sensors 140 including speed/timing sensors for one or both engines 108, 110. The speed/timing sensor input may be transmitted directly to the master ECM 70 from sensors 140 that are dedicated to the master ECM 70. Alternatively, the slave ECMs 72, 74 may transmit the signals to the master 70 via the data link 106 from sensors 146, 148 connected to the slave ECMs 72, 74. Thus, the master ECM 70 may be supplied with speed and timing information from the engines even if the master ECM 70 cannot receive data from the dedicated speed and timing sensors 140 for some reason.

The master ECM 70 may also receive input from switches 142 and from an adjustable engine speed command device, such as a throttle, that transmits a signal proportional to the desired engine speed 144. The master ECM 70 computes a command signal indicative of the desired fuel flow for each engine based on the difference between the desired speed and the actual speed of the engines. The commanded fuel flow signal is transmitted from the master ECM 70 to the slave ECMs 72, 74. A commanded fuel flow signal may be computed separately for each engine, or one signal may be used for both engines. The slave ECMs 72, 74 compute a control signal for driving liquid fuel injectors 128, 130 based on the commanded fuel flow signal from the master ECM 70. The slave ECMs 72, 74 transmit engine speed and maximum fuel flow rate as feedback to the master ECM 70.

In the embodiment of the present invention as shown in FIG. 5, the master ECM 70 functions to coordinate the operation of the slave ECMs 72, 74 and their corresponding engines. Engine monitoring and protection functions may be performed by either the master ECM 70 or the slave ECMs 72, 74. The present invention may be integrated with a plurality of engines so that the load is divided equally among the engines, or the load may be distributed unevenly among the engines.

INDUSTRIAL APPLICABILITY

The present invention may be used in situations where an existing ECM designed for a dual fuel engine may not include enough drivers to accommodate the total number of liquid fuel injectors and gaseous fuel admission valves that are present with dual fuel engines. The preferred embodiment of the present invention as shown in FIGS. 1 and 2 therefore involves combining a plurality of ECMs in a master/slave configuration for controlling one or more dual fuel engines.

The number of slave ECMs required to control the gaseous fuel admission valves 56, 57 in a dual fuel engine 32 depends on the total time available in the engine cycle and the amount of time required for each gaseous fuel admission valve 56, 57 to deliver the required amount of fuel to each cylinder 34, 35. The total time available in the engine cycle depends on the number and configuration of the cylinders, and the number of cylinders that may be injected with fuel concurrently. For example, some engines are arranged with 4 banks of cylinders, wherein 2 cylinders may be injected with fuel at the same time. Other engines are arranged with 2 banks of cylinders, wherein only 1 cylinder is injected at a time. Therefore, a 16 cylinder engine having 4 banks of cylinders may only require 1 slave ECM because only half the amount of time is required to drive the cylinders compared to an engine with the same number of cylinders arranged in 2 banks. The total time available in the engine cycle also varies depending on the engine speed and determining the number of slave ECMs to include depends on the full, or highest, operational speed of the engine.

The functions performed by the master ECM 70 and the slave ECMs 72, 74 may be allocated in various configurations to control various types and numbers of engines. The number of slave ECMs to include in the system depends on whether the engines are dual fuel or single fuel engines, the number of cylinders in each engine, the number of cylinders that can be driven by one ECM, and the time available during each engine cycle to operate the components in each cylinder, such as liquid fuel injectors and gaseous fuel admission valves, if applicable. The information exchanged over the data link 76, 106 therefore will depend on the functions allocated to each ECM.

Other aspects, objects and advantages of the present invention can be obtained from a study of the drawings, the disclosure and the appended claims.

What is claimed is:

1. An apparatus for controlling a plurality of engines, each engine having a corresponding engine speed sensor operable to transmit a sensor speed signal indicative of the engine's speed, the apparatus comprising:

a plurality of slave electronic control modules, each slave electronic control module being in communication with a corresponding engine speed sensor and;

a master electronic control module being in communication with the plurality of slave electronic control modules, the master electronic control module being operable to receive an engine speed command and at least one sensor speed signal, to compute an error signal based on the engine speed command, and transmit the error signal to the slave electronic control modules.

2. The apparatus, as set forth in claim 1, wherein the error signal based on the engine speed command is a fuel flow command signal.

3. The apparatus, as set forth in claim 1, further comprising an adjustable speed command device operable to transmit an engine speed command signal proportional to the desired speed of the engines.

4. The apparatus, as set forth in claim 1, wherein the slave electronic control modules are operable to transmit signals proportional to the corresponding engine speed and fuel flow rate to the master electronic control module.

5. The apparatus, as set forth in claim 2, wherein each engine includes a plurality of cylinders and a plurality of fuel injectors, each fuel injected being connected to supply fuel to a corresponding cylinder, the slave electronic control modules being further operable to compute and transmit a control signal to each fuel injector for a duration of time proportional to the fuel flow command signal.

* * * * *